June 5, 1945.   L. R. LUECK   2,377,638
AIRCRAFT LANDING WHEEL TURBINE
Filed May 1, 1944   3 Sheets-Sheet 1

INVENTOR.
LAWRENCE R. LUECK,
BY
ATTORNEY.

June 5, 1945.　　　　L. R. LUECK　　　　2,377,638
AIRCRAFT LANDING WHEEL TURBINE
Filed May 1, 1944　　　3 Sheets-Sheet 2
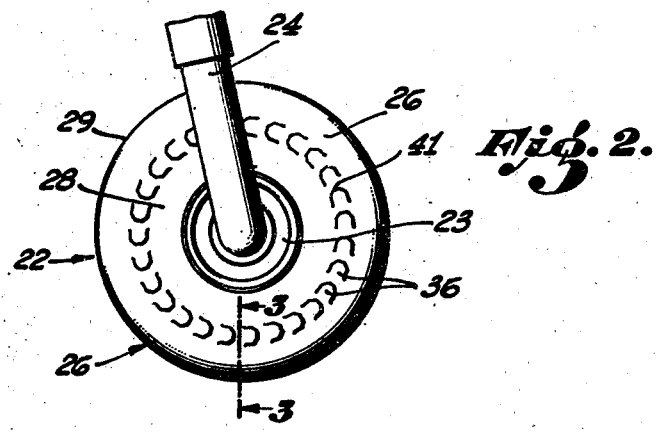
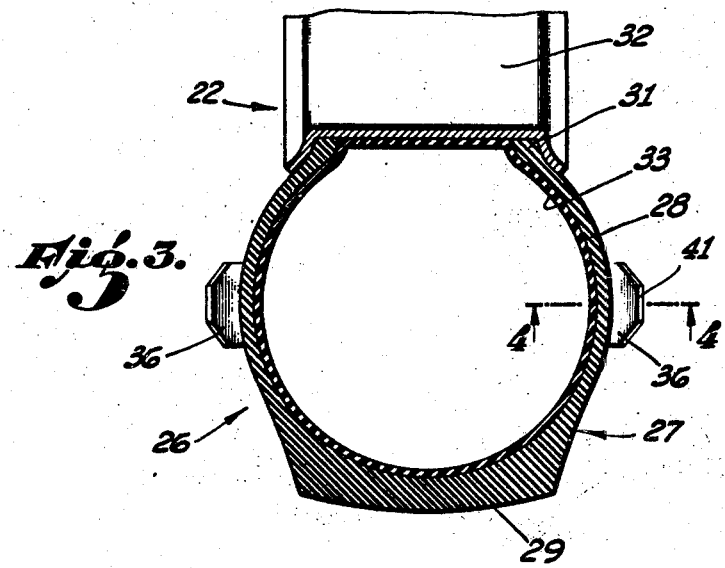
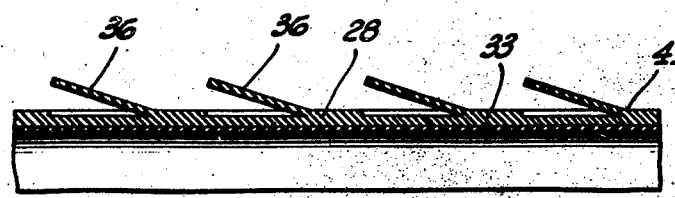
INVENTOR.
LAWRENCE R. LUECK,
BY
ATTORNEY.

June 5, 1945.  L. R. LUECK  2,377,638
AIRCRAFT LANDING WHEEL TURBINE
Filed May 1, 1944   3 Sheets-Sheet 3

INVENTOR.
LAWRENCE R. LUECK,
BY
ATTORNEY.

Patented June 5, 1945

2,377,638

UNITED STATES PATENT OFFICE 2,377,638

AIRCRAFT LANDING WHEEL TURBINE

Lawrence R. Lueck, El Monte, Calif.

Application May 1, 1944, Serial No. 533,556

3 Claims. (Cl. 244—103)

This invention relates to aeronautics, and more particularly to an improvement in the design and construction of the wheels of an aircraft landing gear.

Due largely to the fact that as an airplane approaches a landing its landing wheels normally are not rotating, the initial impact between each of the airplane's wheels and the surface upon which the landing is being made results in the imposition of excessive strains, not only upon the tire, but also upon the entire landing gear. Particularly true is it in respect of large, heavy aircraft that initial contact of each of the tires with the runway produces a cloud of smoke accounted for by the magnitude of the frictional force required to set the landing wheels in motion at a rate proportional to the speed at which the aircraft is then traveling. Consequently, the life of aircraft tires is extremely short, particularly when the relatively high cost of aircraft tires is taken into consideration.

Nor is the damage to aircraft landing gear caused by making landing contact before the wheels are set in rotation at or near a speed proportional to the craft's ground speed limited to the scuffing, and frictional wear of the tires themselves. Not infrequently does the disparity of the tires' circumferential speed and the craft's ground speed impose such strain upon the landing gear that mechanical damage results, and upon the tire that a blowout frequently is caused, thus developing a serious hazard to the entire aircraft as well as to its contents and occupants.

It is an object of the present invention, therefore, to provide an improvement in aircraft landing gear whereby the wheels of an aircraft are set in rotation prior to and in preparation for landing.

A more detailed objection in this connection is to provide means for setting an aircraft wheel into rotation prior to landing which are operated solely by energy from the air as it rushes past the wheel, thereby obviating the necessity of providing any mechanical source of energy and connections between it and the wheel, with a consequent reduction in the liability of the device to become unserviceable through wear or breakage, and also making for lowering of costs of both production and maintenance of the wheel-rotating device.

A still further detailed object in this connection is to provide an aircraft wheel-rotating device which takes the form of vanes either formed integrally with or otherwise secured to the tire, which vanes are acted upon by the air rushing past the tire as the aircraft approaches its landing, in such a manner as to cause the tire and its wheel to rotate at a speed substantially proportionate to the ground speed of the aircraft.

The invention possesses other objects and valuable features, some of which, with those enumerated, will be set forth in the following description of the embodiments of my invention illustrated in the drawings accompanying and forming part of the specification. It is to be understood that I do not limit myself to the showing made by the said drawings and description, as I may adopt variations of the preferred embodiments of my invention without departing from the scope thereof as defined by the claims.

Referring to the drawings:

Figure 2 is an enlarged view in side elevation showing one of the landing wheels and its tire to illustrate to better advantage the aero-turbine vanes of the present invention.

Figure 3 is a transverse, vertical sectional view taken upon the line 3—3 of Fig. 2 with the direction of view as indicated.

Figure 4 is a more highly enlarged detail view in horizontal section taken upon the line 4—4 of Fig. 3 with the direction of view as indicated.

Figure 1:
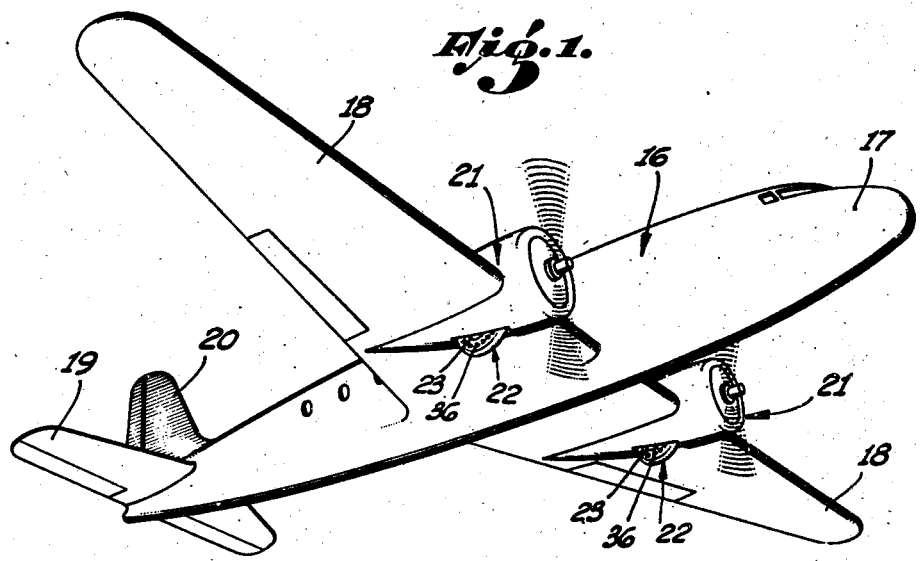
Figure 1 is a perspective of an airplane, the landing gear of which is equipped with tires embodying the aero-turbine forming the subject matter of the present invention.

Figure 1 illustrates a conventional aircraft indicated in its entirety at 16 and comprising a fuselage 17, wings 18, horizontal and vertical rudders, 19 and 20 respectively, sources of power 21, and landing gear 22. In the airplane 16 chosen for illustration, the landing gear 22 is of the conventional type and comprises preferably a plurality of wheels 23 each of which is revolubly mounted upon a standard 24 and a pneumatic tire 26, preferably demountably mounted upon each of the wheels 23.

As most clearly shown in Fig. 3, the tire 26 comprises a casing 27 having sidewalls 28 and a tread portion 29. The sidewalls 28 terminate at their inner peripheral edges in beads 31 which serve for the removable mounting of the casing 27 upon a rim 32 which preferably constitutes a removable portion of the wheel 23. Within the casing 27 an inflatable tube 33 is disposed in accordance with conventional practice. Thus it may be seen that the tire 26 is preferably of conventional construction in all respects except for the incorporation therewith of the aero-turbine vanes 36 which constitute the present invention.

Of these vanes 36 a relatively large number is provided, preferably at equally spaced intervals throughout the entire circumference of the tire 27 and spaced preferably midway between the tread portion 29 and the beads 31. Furthermore, it is preferable that a similar series of these vanes 36 be provided upon each of the sidewalls 28. The vanes 36 all protrude at an oblique angle from the associated sidewall 28 and in the same general direction with respect to the tire's rotation. This permits mounting the tire 26 upon the landing gear 22 in such position that all of the vanes 36 at or near the bottom of the tire project outward and forward with respect to the direction of the airplane's travel, while all of the vanes 36 at or near the upper portion of the tire project outward and aft. Consequently, when the airplane, for example, is approaching a landing and therefore traveling through the air at a very material rate of speed, the air in rushing past the tire 27 in a direction parallel to its two side faces will impinge against all of the vanes 36 (provided, of course, the entire tire is exposed to the air); but due to the obliquity of these vanes the vanes 36 on the lower portion of the tire will offer greater resistance to flow of air therepast than will the vanes 36 on or adjacent the upper portion of the tire. This necessarily follows from the fact that the angle between each of the upper vanes of the adjacent portion of the tires' sidewall which is presented to the relatively moving air, is an obtuse angle; whereas the angle between each of the vanes on the lower portion of the tire and the adjacent portion of the sidewall which is presented to the relatively moving air, is an acute angle wherein a material quantity of air will be entrapped.

Therefore, the relative motion between the wheel 23 and the air through which it is then traveling will set the tire in rotation; and since it is customary for the operator of an aircraft to lower his landing gear while his craft is still a considerable distance from the field upon which he contemplates a landing, under most circumstances sufficient time will elapse between lowering of the wheels and the actual landing to permit the wheels to be set into rotation at a speed approximately proportional to the speed at which the ship actually lands.

In the modification of my invention illustrated in Figures 2, 3, and 4, the vanes 36 are formed integrally with the casing 27. Whether the flaps 36 are formed at the time of molding the tire or are severed therefrom throughout the entire periphery of each except the forward edge 41 thereof, is immaterial as far as the purposes of the present invention are concerned, and is a question the solution of which will be determined by manufacturing expediency. In any event, on completion these vanes 36 are formed preferably on the center portion of each of the sidewalls, i. e., midway between the beads 31 and the tread 29. The vanes all extend obliquely outwards, as most clearly illustrated in Figure 4, in such direction that they protrude angularly outwards and rearwards in respect to the direction in which the tire will rotate when the aircraft is traveling forward with the wheels rotating upon a support.

Figures 5, 7:
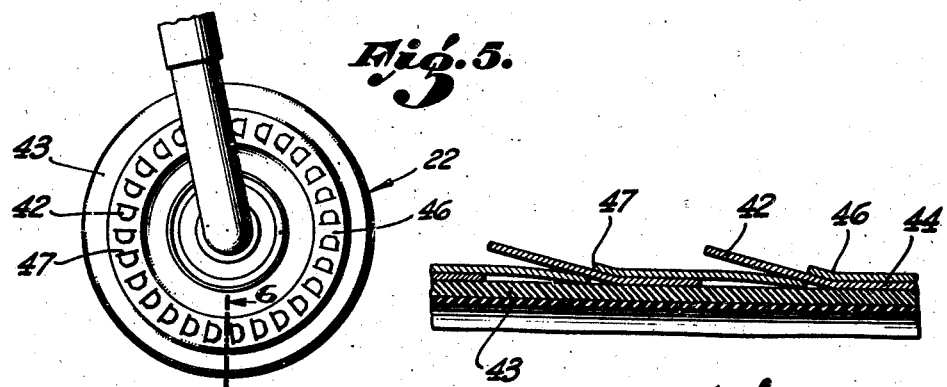
Figure 5 is a view similar to Fig. 2 but illustrating a slightly modified form of the aero-turbine tire of the present invention.
Figure 7 is a detail view in horizontal section taken upon the plane indicated by the line 7—7 of Fig. 6 with the direction of view as indicated.
Figure 6:
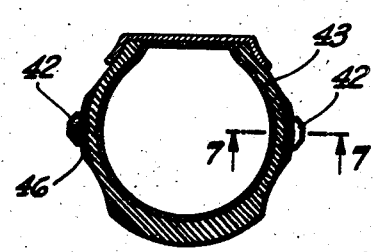
Figure 6 is an enlarged vertical, transverse sectional view, the plane of section being indicated by the line 6—6 of Figure 5 with the direction of view as indicated.

Figures 5, 6 and 7 illustrate a slightly modified form which it is believed will offer convenience from the standpoint of manufacture. In this instance the flaps or vanes 42, instead of being formed integrally with the casing 43, are formed as portions of a continuous strip 44 of resilient material which is disposed just inside the outer layer 46 of casing 43. This outer layer 46 is provided with a series of slits 47 through each of which one of the flaps or vanes 42 protrudes so as to present an arrangement of vanes 42 similar to the vanes 36 of the previously described modifications.

Figure 8:
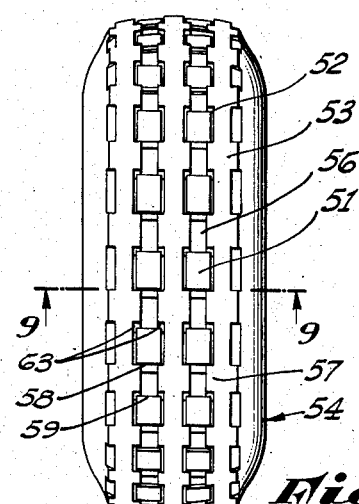
Figure 8 is an elevational view of the tread of an aero-turbine tire embodying a still further modified form of the present invention.
Figure 9:
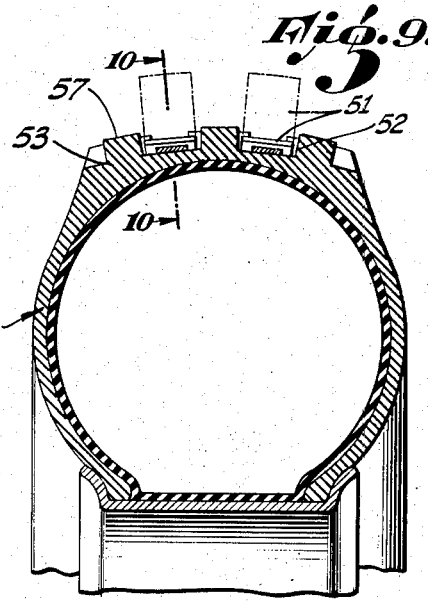
Figure 9 is a horizontal, transverse sectional view, the plane of section being indicated by the line 9—9 of Fig. 8 and the direction of view by the arrows.
Figure 10:
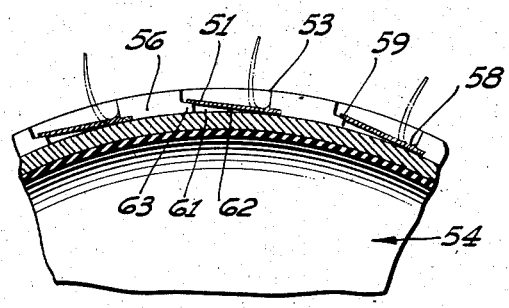
Figure 10 is a detail sectional view taken upon the line 10—10 of Fig. 9, with the direction of view as indicated.

Another modification of the aero-turbine aircraft tire is illustrated in Figures 8, 9 and 10, wherein each of the vanes 51 is seated within a recess 52 in the tread portion 53 of the tire 54 instead of being carried by the sidewall as in the previously described modifications. In the particular tread design here under contemplation, each of these recesses 52 comprise a lateral enlargement of a channel 56 extending circumferentially of the tire, this channel 56 being defined by two laterally spaced bench portions 57 of the tread 56.

The end 58 of each of the vanes 51 which is in advance while the tire rotates is securely and preferably permanently fastened to the casing as by vulcanizing, whereas the other, or trailing edge 59 is free. In order to facilitate entry of air into the acute angle 61 between the vanes 51 and the proximal portion of the bottom 62 and the channel 56, it is preferred that the trailing edge 59 of each of the vanes is supported slightly above the bottom 62 of the channel as by a pair of shoulders 63 spaced apart far enough to engage the outer corners of the vane. In other words, the space between the shoulders 63 of each pair preferably substantially coincides with the width of that portion of the channel 56 which lies between two adjacent recesses 52. Since the vanes 51 normally lie substantially flat and completely within the recesses 52, the channel 56 will be left relatively uninterrupted to permit free passage of air therethrough until the vanes 51 are lifted by the force of the air entrapped thereunder. Since the vanes are constructed of resilient material, the vanes will thus be deflected from the positions wherein they are illustrated in full lines in Figures 9 and 10, to the broken line position where they will offer maximum interference to the flow of air therepast and thereby operate with greatest efficiency in setting up a turbine action, thus causing the tire and the wheel on which it is mounted to rotate in response to the force exerted thereagainst by air rushing therepast. However, after any one of the vanes has been carried from the lower part of the wheel to the upper part, the air rushing past the tire will engage that vane in such a manner as to force it down again into its associated recess 52 where it offers a minimum of resistance to the movement of air therepast, and therefore a minimum impedance to the wheel's rotation.

Figure 11:
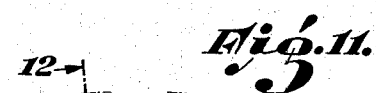
Figure 11 is a view similar to Fig. 9, but showing a still further modified form of aero-turbine tire of the present invention.
Figure 12:
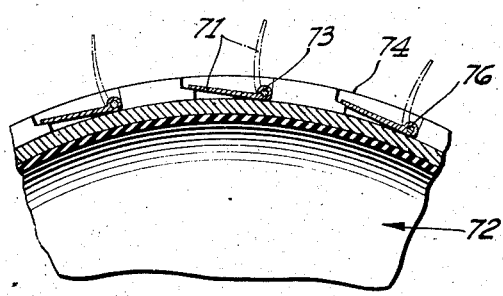
Figure 12 is a detail sectional view taken upon the line 12—12 of Fig. 11, with the direction of view as indicated.

A still further modified form is illustrated in Figures 11 and 12, where each of the vanes 71, instead of being vulcanized or otherwise permanently attached to the casing 72, is mounted thereon by means of a pintle pin 73 extending transversely through the bead 74 and through an eye 76 in the edge of the vane 71. In other respects the vane 71 and the casing 72 are similar in design and operation to the vane 51 and casing 54, respectively, of the previously described modifications.

I claim:

1. In an aircraft tire, a tread comprising a pair of bench portions spaced apart laterally to define a channel extending circumferentially around said tire, and a plurality of vanes mounted on said tire for movement from positions substantially of tangency to positions of greater angularity with the adjacent portion of said tread's circumferential surface, said vanes lying within said channel and all of said vanes extending in the same direction when in such position of substantial tangency.

2. In an aircraft tire, a tread comprising a pair of bench portions spaced apart laterally to define a channel extending circumferentially around said tire, and a plurality of vanes mounted on said tire for movement from positions substantially of tangency to positions of greater angularity with the adjacent portion of said tread's circumferential surface, said vanes lying within said channel and all extending in the same direction when in said positions of substantial tangency, and means providing a shoulder supporting the outer end of each of said vanes to elevate said end above the bottom of said channel and thereby permit entry of air to the acute angle between said vane and the channel bottom to facilitate movement of said vane to its said position of greater angularity by air moving in the direction opposite that in which said free end points.

3. In an aircraft landing gear, a tire having a plurality of slits therein, each of said slits extending in a plane substantially perpendicular to a tangent to said tire's circumference proximal to that slit, and a strip of resilient material underlying the portion of said tire having said slits therein and having a plurality of flaps thereon, one end of said flaps being connected to said strip and the free ends of said flaps all pointing in the same direction longitudinally of said strip, and each of said flaps projecting through one of said slits to present a vane projecting angularly from the outer surface of said tire offering greater resistance to movement of air past said tire in one direction perpendicular to said tire's axis of rotation than in the opposite direction.

LAWRENCE R. LUECK.